(12) United States Patent
Koker et al.

(10) Patent No.: US 9,436,972 B2
(45) Date of Patent: Sep. 6, 2016

(54) SYSTEM COHERENCY IN A DISTRIBUTED GRAPHICS PROCESSOR HIERARCHY

(71) Applicant: Intel Corporation, Santa Clara, CA (US)

(72) Inventors: Altug Koker, El Dorado Hills, CA (US); Aditya Navale, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 81 days.

(21) Appl. No.: 14/227,525

(22) Filed: Mar. 27, 2014

(65) Prior Publication Data
US 2015/0278984 A1 Oct. 1, 2015

(51) Int. Cl.
G09G 5/36 (2006.01)
G06T 1/00 (2006.01)
G06F 15/00 (2006.01)
G06T 1/60 (2006.01)
G06F 12/08 (2016.01)

(52) U.S. Cl.
CPC ............ *G06T 1/60* (2013.01); *G06F 12/0811* (2013.01); *G06F 12/0813* (2013.01); *G06F 12/0831* (2013.01); *G06F 2212/1024* (2013.01); *G06F 2212/455* (2013.01)

(58) Field of Classification Search
None
See application file for complete search history.

(56) References Cited

U.S. PATENT DOCUMENTS

| 8,643,660 B2 | 2/2014 | Offen et al. | |
| 2006/0098022 A1* | 5/2006 | Andrews | G06T 15/005 345/557 |
| 2013/0042070 A1* | 2/2013 | Jalal | G06F 12/084 711/130 |
| 2013/0111141 A1* | 5/2013 | Kessler | G06F 12/0813 711/130 |
| 2015/0054836 A1* | 2/2015 | Bolz | G06T 11/40 345/505 |

FOREIGN PATENT DOCUMENTS

| CN | 101093578 A | 12/2007 |
| KR | 2006-0087561 A | 8/2006 |
| KR | 2011-0019775 A | 2/2011 |
| TW | 200728985 A | 8/2007 |
| TW | 200815992 A | 4/2008 |
| TW | 200915059 A | 4/2009 |
| TW | 200945057 A | 11/2009 |
| TW | 201106159 A | 2/2011 |

(Continued)

OTHER PUBLICATIONS

Office Action received for Korean Patent Application No. 2015-0028622, mailed Nov. 4, 2015, 8 pages including 3 pages of English translation.

(Continued)

*Primary Examiner* — Jacinta M Crawford
(74) *Attorney, Agent, or Firm* — Jordan IP Law, LLC

(57) ABSTRACT

Methods and systems may provide for executing, by a physically distributed set of compute slices, a plurality of work items. Additionally, the coherency of one or more memory lines associated with the plurality of work items may be maintained, by a cache fabric, across a graphics processor, a system memory and one or more host processors. In one example, a plurality of crossbar nodes track the one or more memory lines, wherein the coherency of the one or more memory lines is maintained across a plurality of level one (L1) caches and a physically distributed cache structure. Each L1 cache may be dedicated to an execution block of a compute slice and each crossbar node may be dedicated to a compute slice.

18 Claims, 9 Drawing Sheets

(56) References Cited

FOREIGN PATENT DOCUMENTS

| | | |
|---|---|---|
| TW | 201120630 A | 6/2011 |
| TW | 201303602 A | 1/2013 |

OTHER PUBLICATIONS

Notice of Allowance for Taiwanese Patent Application No. 104103891, mailed on Jun. 29, 2016, 3 pages with 1 page of English Translation.

Notice of Allowance for Korean Patent Application No. 2015-0028622, mailed on May 10, 2016, 3 pages with 1 page of English Translation.

\* cited by examiner

| Original Request | L2$ | Other L1$ | Issuing L1$ | L1$ Valid (SSV) | L2$ State | Other SS$ | Issuing SS$ | L1$ Valid (SSV) | SSV Action | Xsnp |
|---|---|---|---|---|---|---|---|---|---|---|
| L1$ Read | M | S | I | 1 | M | S | S | >1 | Append | no |
| | M | S | I | >1 | M | S | S | >1 | Append | no |
| | M | I | I | 0 | M | I | S | 1 | Append | no |
| | M | I | I | 1 | M | I | S | 1 | Replace | no |
| | E | I | I | >1 | M | I | S | >1 | Append | no |
| | E | S | I | 1 | E | S | S | >1 | Append | no |
| | E | S | I | >1 | E | S | S | >1 | Append | no |
| | E | I | I | 0 | E | I | S | 1 | Append | no |
| | S | I | I | 1 | E | I | S | 1 | Replace | no |
| | S | S | I | >1 | S | S | S | >1 | Append | no |
| | S | S | I | 1 | S | S | S | >1 | Append | no |
| | S | I | I | 0 | S | I | S | 1 | Append | no |
| | I | I | I | 0 | S | I | S | 1 | Append | no |

FIG. 3A

| Original Request 45 | L2$ 49 | Other L1$ 51 | Issuing L1$ 53 | L1$ Valid (SSV) 46 | L2$ State 55 | Other SS$ 57 | Issuing SS$ 59 | L1$ Valid (SSV) 61 | SSV Action 63 | Xsnp 65 |
|---|---|---|---|---|---|---|---|---|---|---|
| L1$ Write | M | S | S | >1 | M | I | I | 0 | Clear | Snp Inv |
| | | S | I | 1 | M | I | I | 0 | Clear | Snp Inv |
| | | S | I | >1 | M | I | I | 0 | Clear | Snp Inv |
| | | I | S | >1 | M | I | I | 0 | Clear | Snp Inv |
| | | I | I | 1 | M | I | I | 0 | Clear | Snp Inv |
| | | I | I | >1 | M | I | I | 0 | Clear | Snp Inv |
| | | I | S | 1 | M | I | I | 0 | Clear | none |
| | | I | I | 0 | M | I | I | 0 | Clear | none |
| | E | S | S | >1 | M | I | I | 0 | Clear | Snp Inv |
| | | S | I | 1 | M | I | I | 0 | Clear | Snp Inv |
| | | S | I | >1 | M | I | I | 0 | Clear | Snp Inv |
| | | I | S | >1 | M | I | I | 0 | Clear | Snp Inv |
| | | I | I | 1 | M | I | I | 0 | Clear | Snp Inv |
| | | I | S | 1 | M | I | I | 0 | Clear | none |
| | | I | I | 0 | M | I | I | 0 | Clear | none |
| | S | S | S | >1 | M | I | I | 0 | Clear | Snp Inv |
| | | S | I | 1 | M | I | I | 0 | Clear | Snp Inv |
| | | S | I | >1 | M | I | I | 0 | Clear | Snp Inv |
| | | I | S | >1 | M | I | I | 0 | Clear | Snp Inv |
| | | I | I | 1 | M | I | I | 0 | Clear | Snp Inv |
| | | I | S | 1 | M | I | I | 0 | Clear | none |
| | I | I | I | 0 | M | I | I | 0 | None | none |

FIG. 3B

| Original Request | L2$ | Other L1$ | Issuing L1$ | L1$ Valid (SSV) | L2$ State | Other SS$ | Issuing SS$ | L1$ Valid (SSV) | SSV Action | Xsnp |
|---|---|---|---|---|---|---|---|---|---|---|
| L2$ Evict | E | I | I | 0 | I | — | — | 0 | None | None |
| | | S | I | 1 | I | — | — | 0 | Clear | Snp Inv |
| | | I | S | 1 | I | — | — | 0 | Clear | Snp Inv |
| | | S | S | >1 | I | — | — | 0 | Clear | Snp Inv |
| | | S | I | >1 | I | — | — | 0 | Clear | Snp Inv |
| | | S | S | >1 | I | — | — | 0 | Clear | Snp Inv |
| | S | I | I | 0 | I | — | — | 0 | None | None |
| | | S | I | 1 | I | — | — | 0 | Clear | Snp Inv |
| | | I | S | 1 | I | — | — | 0 | Clear | Snp Inv |
| | | S | S | >1 | I | — | — | 0 | Clear | Snp Inv |
| | | S | I | >1 | I | — | — | 0 | Clear | Snp Inv |
| | | S | S | >1 | I | — | — | 0 | Clear | Snp Inv |
| | M | I | I | 0 | I | — | — | 0 | None | None |
| | | I | I | 1 | I | — | — | 0 | Clear | Snp Inv |
| | | I | S | >1 | I | — | — | 0 | Clear | Snp Inv |
| | | S | I | 1 | I | — | — | 0 | Clear | Snp Inv |
| | | S | S | >1 | I | — | — | 0 | Clear | Snp Inv |
| | | S | I | >1 | I | — | — | 0 | Clear | Snp Inv |
| L2$ Read | I | I | I | 0 | S | — | — | 0 | None | None |

FIG. 3C

| Original Request | L2$ | Other L1$ | Issuing L1$ | L1$ Valid (SSV) | L2$ State | Other SS$ | Issuing SS$ | L1$ Valid (SSV) | SSV Action | Xsnp |
|---|---|---|---|---|---|---|---|---|---|---|
| Host Snoop Invalidate | M | I | I | 0 | — | — | — | 0 | None | None |
|  | M | I | I | 0 | — | — | — | 0 | None | None |
|  | M | S | S | 1 | — | — | — | 0 | Clear | Snp Inv |
|  | M | I | I | 1 | — | — | — | 0 | Clear | Snp Inv |
|  | M | S | S | >1 | — | — | — | 0 | Clear | Snp Inv |
|  | M | S | I | >1 | — | — | — | 0 | Clear | Snp Inv |
|  | M | S | S | >1 | — | — | — | 0 | Clear | Snp Inv |
|  | E | I | I | 0 | — | — | — | 0 | None | None |
|  | E | I | S | 1 | — | — | — | 0 | Clear | Snp Inv |
|  | E | S | I | 1 | — | — | — | 0 | Clear | Snp Inv |
|  | E | S | S | >1 | — | — | — | 0 | Clear | Snp Inv |
|  | E | S | I | >1 | — | — | — | 0 | Clear | Snp Inv |
|  | E | S | S | >1 | — | — | — | 0 | Clear | Snp Inv |
|  | S | I | I | 0 | — | — | — | 0 | None | None |
|  | S | I | S | 1 | — | — | — | 0 | Clear | Snp Inv |
|  | S | S | I | 1 | — | — | — | 0 | Clear | Snp Inv |
|  | S | I | S | >1 | — | — | — | 0 | Clear | Snp Inv |
|  | S | S | I | >1 | — | — | — | 0 | Clear | Snp Inv |
|  | S | S | S | >1 | — | — | — | 0 | Clear | Snp Inv |

FIG. 3D

| Original Request | L2$ | Other L1$ | Issuing L1$ | L1$ Valid (SSV) | L2$ State | Other SS$ | Issuing SS$ | L1$ Valid (SSV) | SSV Action | Xsnp |
|---|---|---|---|---|---|---|---|---|---|---|
| Host Snoop Data | M | I | I | 0 | I | I | I | 0 | None | None |
| Host Snoop Data | M | I | I | 0 | S | I | I | 0 | None | None |
| Host Snoop Data | M | S | S | 1 | S | S | S | 1 | None | None |
| Host Snoop Data | M | I | I | 1 | S | I | I | 1 | None | None |
| Host Snoop Data | M | S | S | >1 | S | S | S | >1 | None | None |
| Host Snoop Data | M | I | I | >1 | S | I | I | >1 | None | None |
| Host Snoop Data | E | S | S | 0 | S | S | S | 0 | None | None |
| Host Snoop Data | E | I | I | 1 | S | I | I | 1 | None | None |
| Host Snoop Data | E | S | S | 1 | S | S | S | 1 | None | None |
| Host Snoop Data | E | I | I | >1 | S | I | I | >1 | None | None |
| Host Snoop Data | E | S | S | >1 | S | S | S | >1 | None | None |
| Host Snoop Data | S | I | I | 0 | S | I | I | 0 | None | None |
| Host Snoop Data | S | I | I | 1 | S | I | I | 1 | None | None |
| Host Snoop Data | S | S | S | >1 | S | S | S | >1 | None | None |
| Host Snoop Data | S | S | S | >1 | S | S | S | >1 | None | None |

FIG. 3E

SYSTEM COHERENCY IN A DISTRIBUTED GRAPHICS PROCESSOR HIERARCHY

BACKGROUND

Certain applications such as games and media players may use embedded designs, graphics processing units (GPUs), etc., to handle compute intensive workloads. In such a case, a central processing unit (CPU) may dispatch a workload to, for example, a GPU in the form of one or more commands, wherein the GPU may internally execute a work group containing multiple work items in response to the one or more commands. In order to maintain sequential consistency between work items and work groups on the GPU, solutions such as barrier commands ("barriers"), memory fences and unordered atomic operations ("atomics") may be used. Such solutions, however, may be coarse grained and unable to control specific memory access orderings. Moreover, conventional solutions may be unable to ensure memory consistency (e.g., coherency) across the GPU and the CPU unless hardware flushes and software stack calls are used, wherein flushes and stack calls may have a negative impact on performance.

BRIEF DESCRIPTION OF THE DRAWINGS

The various advantages of the embodiments will become apparent to one skilled in the art by reading the following specification and appended claims, and by referencing the following drawings, in which:

FIGS. 3A to 3E are illustrations of examples of coherency protocol tables according to an embodiment;

DETAILED DESCRIPTION

Figure 1A:
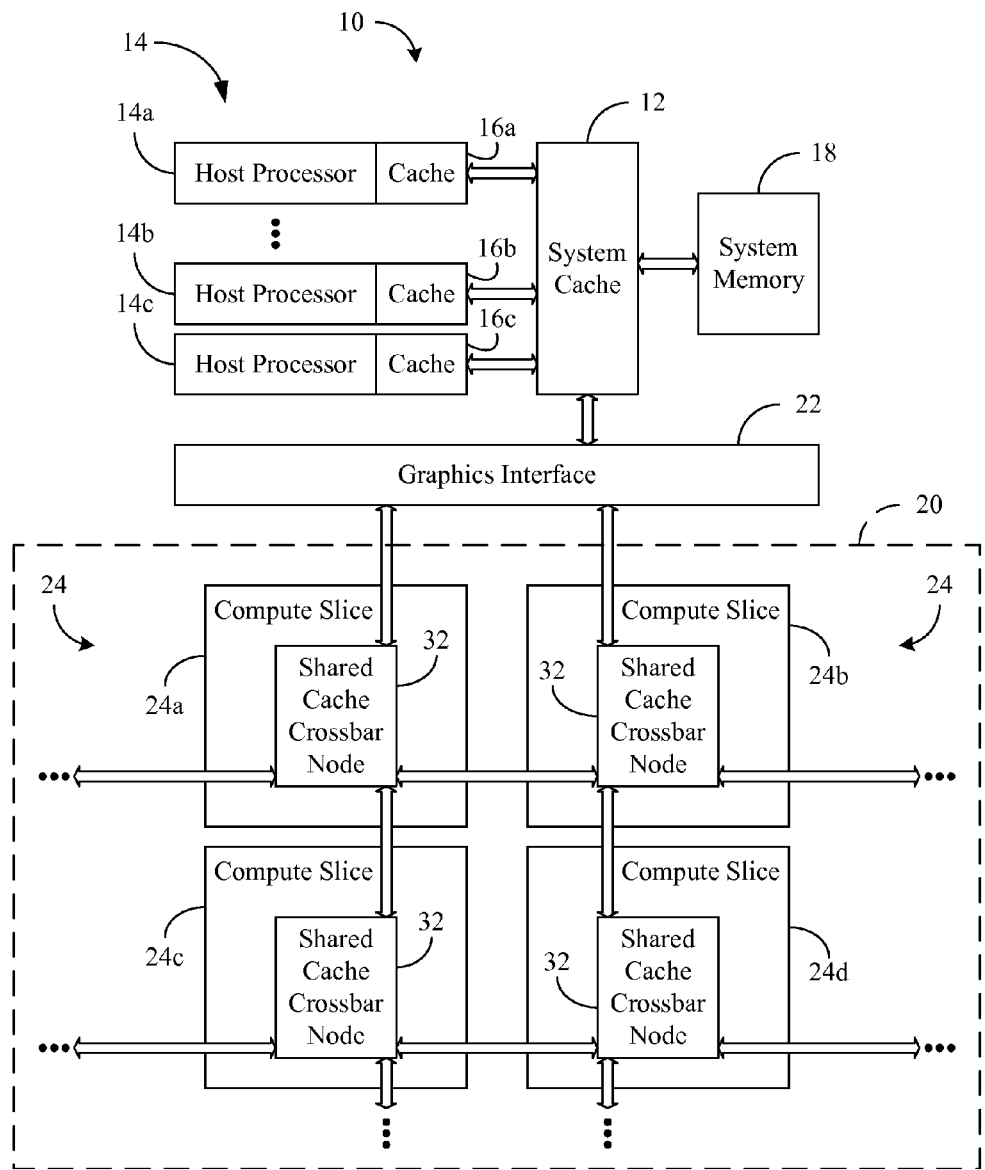
FIG. 1A is a block diagram of an example of a computing architecture according to an embodiment.
Figure 1B:
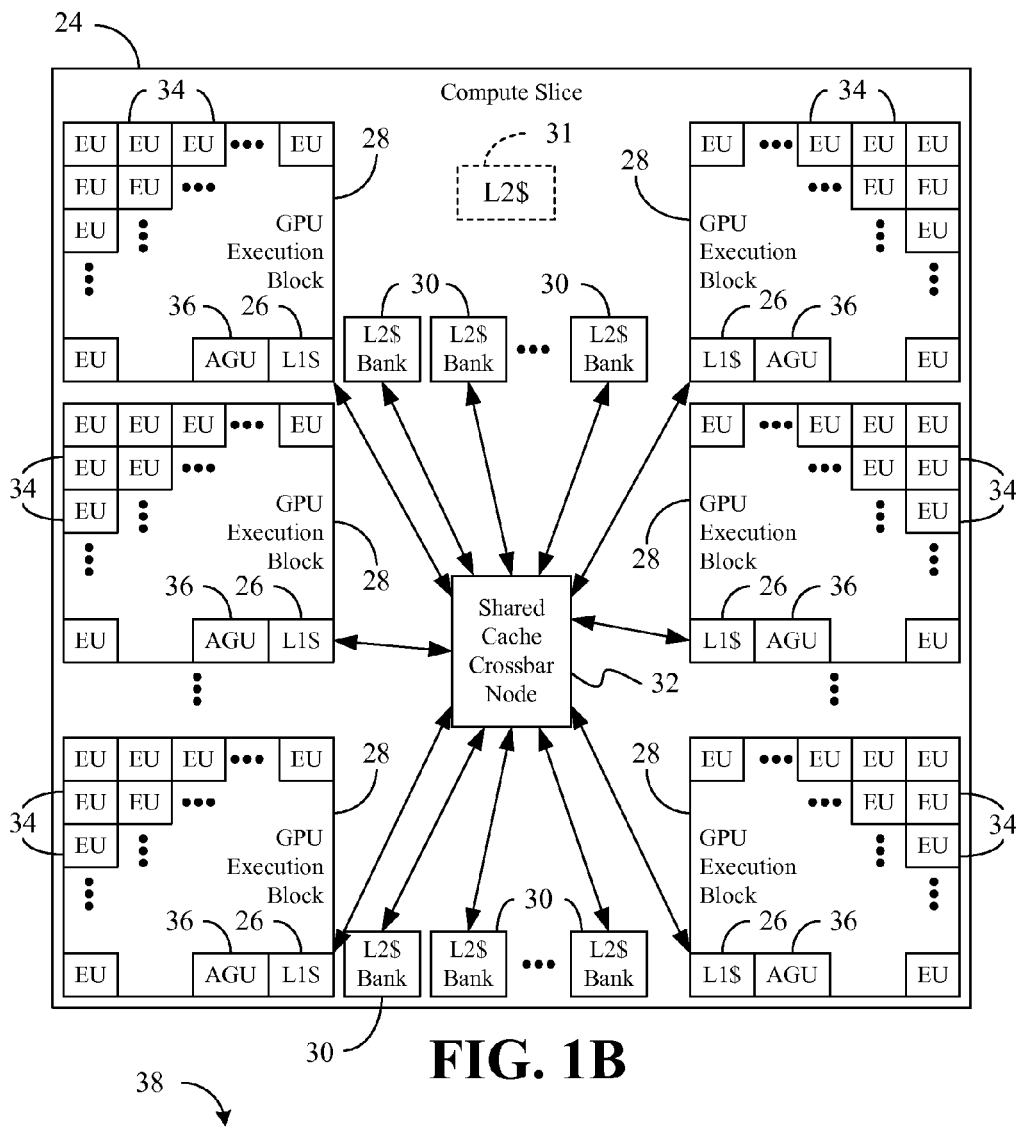
FIG. 1B is a block diagram of an example of a compute slice according to an embodiment.

FIGS. 1A and 1B show a computing architecture 10 that may generally be part of a computing platform such as, for example, a smart phone, tablet computer, mobile Internet device (MID), smart television (TV), media player, notebook computer, desktop computer, server, wearable device, etc. As best shown in FIG. 1A, a system cache 12 (e.g., static random access memory/SRAM, snoop filter) may be coupled to a plurality of host processors 14 (14a-14c) having dedicated caches 16 (16a-16c, e.g., SRAM). The system cache 12 may also be coupled to a system memory 18 (e.g., dynamic random access memory/DRAM, "main memory") that is used to store data, instructions, etc., for various components of the architecture 10. Each host processor 14 may be a central processing unit (CPU) capable of executing applications, scripts, etc., related to the presentation of visual content, and issuing associated workloads to a graphics processor 20 via a graphics interface 22. The system cache 12 may generally track the presence of memory lines (e.g., cache lines or other data structures) associated with those workloads and provide snoop filtering services, wherein the graphics interface 22 may evaluate snoop requests received from the system cache 12 and send them to the appropriate cache destinations on the graphics processor 20 for further evaluation.

The graphics processor 20 may generally handle compute intensive workloads such as, for example, pixel color value calculations, histogram calculations, and so forth, to support and/or facilitate the presentation of visual content (e.g., three-dimensional/3D graphics, non-3D images, etc.). More particularly, the illustrated graphics processor 20 includes a physically distributed set of compute slices 24 (24a-24d) to execute a plurality of work items, and a cache fabric to maintain the coherency of one or more memory lines (e.g., system defined size) associated with the plurality of work items across the graphics processor 20, the system memory 18 and the host processor 14. As will be discussed in greater detail below, the cache fabric may provide a fine grained approach to maintaining sequential consistency between work items and work groups, controlling specific memory access orderings and ensuring memory consistency (e.g., coherency).

As best shown in FIG. 1B, the cache fabric may include a plurality of level one (L1) caches 26 ("L1$"), each L1 cache 26 being dedicated to an execution block 28 of a compute slice 24. The plurality of L1 caches 26 may therefore provide relatively high bandwidth and low latency storage to the execution blocks 28 while memory lines are being tracked by the cache fabric. Each execution block 28 may include an array of execution units (EUs) 34 to execute the work items and an address generation unit (AGU) 36 to perform the effective address calculations (e.g., using integer arithmetic) involved in addressing data operands in memory.

The cache fabric may also include a physically distributed shared cache structure 30, wherein the coherency of the one or more memory lines is to be maintained across the plurality of L1 caches 26 and the shared cache structure 30. Configuring the shared cache structure 30 as a physically distributed entity may enable the size of the shared cache structure 30 to be maximized, while meeting the bandwidth demands of each of the execution blocks 28. In the illustrated example, the shared cache structure 30 is configured as a level two cache ("L2$") having a plurality of banks. In such a case, the shared cache structure 30 may hash the memory lines across the plurality of banks in order to ensure even distribution of data across the shared cache structure 30. The illustrated approach may provide a larger and more scalable cache with minimal snooping penalty (e.g., relatively small performance impact to handle snoop requests), with a potential increase in cross-compute slice traffic. Alternatively, the shared cache structure 30 may be configured as a plurality of independent level two (L2) caches 31, wherein each L2 cache 31 is dedicated to a compute slice. Such an approach may provide local storage for the execution blocks 28, while minimizing cross-compute traffic. Both implementation choices may achieve coherency using the same snoop tracking logic.

Additionally, the cache fabric may include a plurality of crossbar nodes 32 (e.g., cache bridges) to track the one or more memory lines, each crossbar node 32 being dedicated to a compute slice 24. The crossbar nodes 32 may distribute snoop requests originating from the system cache 12 to the shared cache structure 30 and the L1 caches 26. Additionally, the crossbar nodes 32 may collect one or more snoop results from the shared cache structure 30 and the plurality of L1 caches 26, and communicate the collected snoop results to the system cache 12 via the graphics interface 22. As will be discussed in greater detail, the cache fabric may use a modified, exclusive, shared, invalid (MESI) protocol to maintain the coherency of the one or more memory lines.

The illustrated architecture 10 therefore uses the cache fabric of the graphics processor 20, the dedicated caches 16 of the host processors 14, the system cache 12 and the system memory 18 to achieve a memory/cache hierarchy that is able to maintain sequential consistency between graphics work items and work groups, control specific memory access orderings and ensure coherency across the entire architecture 10. Such a fined grained approach may be particularly advantageous relative to conventional approaches that rely upon barriers, memory fences, unordered atomics, hardware flushes and software stack calls.

For example, load (e.g., read operation) and store (e.g., write operation) tracking may begin at the level of the execution blocks 28, where reads of the system memory 18 may return valid data and the higher levels in the memory hierarchy may track the presence of the impacted memory line(s) for the next lower level in the hierarchy. Low levels in the hierarchy may be permitted to silently drop their memory lines for replacement unless a victim line (e.g., memory line that has been evicted from cache due to replacement) is modified. Write tracking may be more restrictive, where the originator of each write, based on the size of the write relative to a memory line, may achieve ownership of the destination address before the originator updates its L1 cache 26. For simplicity, a policy may be implemented in which only one copy of a modified memory line is permitted to be present on the entire cache fabric. Such a policy may provide for tracking the latest copy of the memory line while making the exchange of data relatively precise.

Figure 2:
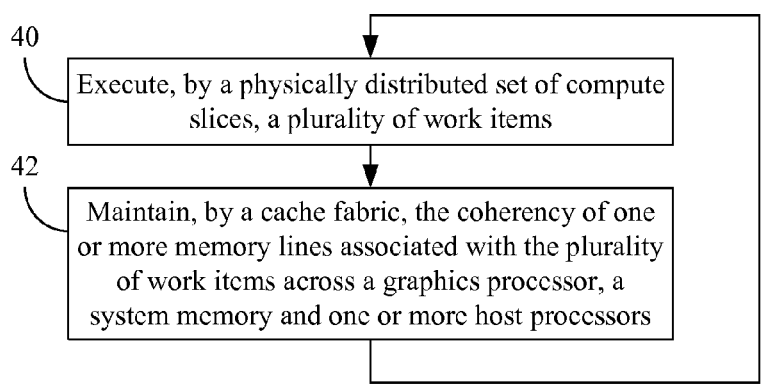
FIG. 2 is a flowchart of an example of a method of operating a graphics processor according to an embodiment.

Turning now to FIG. 2, a method 38 of operating a graphics processor is shown. The method 38 may be implemented in executable software as a set of logic instructions stored in a machine- or computer-readable storage medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 40 provides for executing, by a physically distributed set of compute slices, a plurality of work items. Block 42 may maintain, by a cache fabric, the coherency of one or more memory lines associated with the plurality of work items across the graphics processor, a system memory and one or more host processors. Block 42 may involve tracking, by a plurality of crossbar nodes, the one or more memory lines, wherein the coherency of the one or more memory lines is maintained across a plurality of L1 caches and a physically distributed cache structure, each L1 cache being dedicated to an execution block of a compute slice and each crossbar node being dedicated to a compute slice. Moreover, the shared cache structure may either use a plurality of independent L2 caches to track the one or more memory lines, or hash at least one of the one or more memory lines across a plurality of banks of an L2 cache. In the case of the independent L2 caches, each L2 cache may be dedicated to a compute slice.

Block 42 may also involve distributing, by the plurality of crossbar nodes, one or more snoop requests originating from a system cache coupled to the one or more host processors to the shared cache structure and the plurality of L1 caches. Additionally, block 42 may provide for collecting, by the plurality of crossbar nodes, one or more snoop results from the shared cache structure and the plurality of L1 caches, and communicating, by the plurality of crossbar nodes, the one or more snoop results to the system cache coupled to the one or more host processors. Block 42 may also include using, by the cache fabric, a MESI protocol to maintain the coherency of the one or more memory lines.

FIGS. 3A to 3E generally show an approach to implementing a coherency protocol in which each memory line is marked with one of the MESI (modified, exclusive, shared, invalid) states. More particularly, the modified state may be used when the memory line is present only in the current cache and it is "dirty" (e.g., the memory line has been changed from the value in system memory). If a particular cache has a memory line that is in the modified state, the cache may be required to write the data corresponding to that memory line back to system memory before a read of that memory line from the system memory will be permitted. Such a "write back" may result in the memory line being changed to the exclusive state in the cache.

The exclusive state may be used when the memory line is present only in the current cache and it is "clean" (e.g., the memory line matches the value in system memory). In such a case, the memory line may be changed to the shared state in response to a read request to the cache. The memory line may also be changed to the modified state in response to a write request to the cache. The shared state may indicate that the memory line is clean and it may be stored in other caches of the system. A shared memory line may also be discarded (e.g., changed to the invalid state) at any time. The invalid state may be used to indicate that a memory line is unused (e.g., evicted from the cache). As already noted, the cache fabric may use the MESI protocol to maintain memory consistency across the graphics processor, the system memory and the dedicated caches of the host processors. The examples shown in FIGS. 3A to 3E are taken from the perspective of a particular L1 cache ("Issuing L1$").

For example, FIG. 3A shows a coherency protocol table 44 for read operations directed to a particular L1 cache. In the illustrated example, the "Original Request" column 45 indicates the type of operation being performed with respect to a particular memory line, the "L2$" column 47 indicates the state of the memory line in the L2 cache when the operation is requested, the "Other L1$" column 49 indicates the state of the memory line in the other L1 caches when the operation is requested, the "Issuing L1$" 51 column indicates the state of the memory line in the L1 cache in question when the operation is requested, the first "L1$ Valid (SSV)" column 53 indicates the number of sub-slice valid (SSV) caches (e.g., the number L1 caches having valid data for the memory line) when the operation is requested, the "L2$ State" column 55 indicates the state of the memory line in the L2 cache after the operation is performed, the "Other SS$" column 57 indicates the state of the memory line in the other L1 caches after the operation is performed, the "Issuing SS$" column 59 indicates the state of the memory line in the L1 cache in question after the operation is performed, the second "L1$ Valid (SSV) column 61 indicates the number of SSV caches after the operation is performed, the "SSV Action" column 63 indicates the action taken with respect to a valid bit associated with the memory line, and the "Xsnp" column 65 indicates whether a cross snoop operation is to be performed after the requested operation.

Thus, for example, as shown in the first row 54 of the table 44, a read operation might be directed to a particular L1 cache when the corresponding memory line is in the modified state in the L2 cache as shown in column 47, the shared state in the other L1 caches as shown in column 49, and the invalid state in the issuing L1 cache as shown in column 51. The number of SSV caches may be one as shown in column 53, in the illustrated example. If so, after the read operation, the memory line will be in the modified state in the L2 cache as shown in column 55, the shared state in the other L1 caches as shown in column 57, and the shared state (changed) in the issuing L1 cache as shown in column 59, wherein the number of SSV caches will be greater than one as shown in column 61, in the illustrated example. Moreover, the valid bit may be appended to the memory line in the issuing L1 cache as shown in column 63, and no cross snoop operations may be needed (e.g., silent evictions permitted), as shown in column 65.

By contrast, the fourth row 56 of the table 44 demonstrates that a read operation may be directed to a particular L1 cache when the corresponding memory line is in the modified state in the L2 cache as shown in column 47, the invalid state in the other L1 caches as shown in column 49, and the invalid state in the issuing L1 cache as shown in column 51. The number of SSV caches may be one as shown in column 53, in the illustrated example. If so, after the read operation, the memory line will be in the modified state in the L2 cache as shown in column 55, the invalid state in the other L1 caches as shown in column 57, and the shared state (due to a state change) in the issuing L1 cache as shown in column 59, wherein the number of SSV caches will be greater than one as shown in column 61, in the illustrated example. The valid bit may be replaced for the memory line in the issuing L1 cache as shown in column 63, and no cross snoop operations may be needed as shown in column 65. Similar transitions and/or rules may be implemented for read operation scenarios in which the corresponding memory line is in the exclusive, shared and/or invalid state in the L2 cache, as demonstrated in the remainder of the table 44.

FIG. 3B shows a coherency protocol table 46 for write operations to an issuing L1 cache. In the illustrated example, the ninth row 58 of the table 46 demonstrates that a write operation might be directed to a particular L1 cache when the corresponding memory line is in the exclusive state in the L2 cache as shown in column 47, the shared state in the other L1 caches as shown in column 49, and the shared state in the issuing L1 cache as shown in column 51. The number of SSV caches will be greater than one as shown in column 53, in the illustrated example. Additionally, after the write operation, the memory line will be in the modified state (due to a state change) in the L2 cache as shown in column 55, the invalid state (due to a state change) in the other L1 caches as shown in column 57, and the invalid state (due to a state change) in the issuing L1 cache as shown in column 59, wherein the number of SSV caches will be zero as shown in column 61, in the illustrated example. The valid bit may be cleared in the issuing L1 cache as shown in column 63, and a snoop invalidation operation ("Snp Inv") may be conducted as shown in column 65. Similar transitions and/or rules may be implemented for write operation scenarios in which the corresponding memory line is in the modified, shared and/or invalid state in the L2 cache, as demonstrated in the remainder of table 46.

FIG. 3C shows a coherency protocol table 48 for eviction and read operations with respect to the L2 cache. In the illustrated example, the seventh row 60 of the table 48 demonstrates that an eviction operation may be directed from an issuing L1 cache to the L2 cache when the corresponding memory line is in the shared state in the L2 cache as shown in column 47, the invalid state in the other L1 caches as shown in column 49, and the invalid state in the issuing L1 cache as shown in column 51. The number of SSV caches will be zero as shown in column 53, in the illustrated example. After the eviction operation, the memory line will be in the invalid state (changed) in the L2 cache as shown in column 55, the invalid state in the other L1 caches as shown in column 57, and the invalid state in the issuing L1 cache as shown in column 59, wherein the number of SSV caches will be zero as shown in column 61, in the illustrated example. Moreover, no actions may need to be taken with regard to the valid bit as shown in column 63 or with regard to cross snoop operations as shown in column 65. Similar transitions and/or rules may be implemented for eviction operation scenarios in which the corresponding memory line is in the exclusive and/or modified state in the L2 cache, as demonstrated in the remainder of table 46.

Additionally, the last row 62 of the table 48 demonstrates that a read operation may be directed from an issuing L1 cache to the L2 cache (e.g., in response to an L1 cache miss) when the corresponding memory line is in the invalid state in the L2 cache as shown in column 47, the invalid state in the other L1 caches as shown in column 49, and the invalid state in the issuing L1 cache as shown in column 51. The number of SSV caches may be zero as shown in column 53, in the illustrated example. Thus, after the read operation, the memory line will be in the shared state (due to a state change) in the L2 cache as shown in column 55, the invalid state in the other L1 caches as shown in column 57, and the invalid state in the issuing L1 cache as shown in column 59, wherein the number of SSV caches will remain at zero as shown in column 61, in the illustrated example. Moreover, no actions may need to be taken with regard to the valid bit as shown in column 63 or with regard to cross snoop operations as shown in column 65.

FIG. 3D shows a coherency protocol table 50 for snoop invalidation operations originating from a cache coupled to a host processor such as, for example, a host processor 14 (FIG. 1A), already discussed. In the illustrated example, the second row 64 of the table 50 demonstrates that a snoop invalidation operation might be directed to the graphics cache fabric when the corresponding memory line is in the modified state in the L2 cache as shown in column 47, the invalid state in the other L1 caches as shown in column 49, and the invalid state in the issuing L1 cache as shown in column 51. The number of SSV caches will be zero as shown in column 53, in the illustrated example. Additionally, after the snoop invalidation operation, the memory line will be in the invalid state in the L2 cache as shown in column 55, the invalid state in the other L1 caches as shown in column 57, and the invalid state in the issuing L1 cache as shown in column 59, wherein the number of SSV caches will remain zero as shown in column 61, in the illustrated example. Moreover, no actions may need to be taken with regard to the valid bit as shown in column 63 or with regard to cross snoop operations as shown in column 65.

By contrast, the third row 66 of the table 50 demonstrates that a snoop invalidation operation may be directed to the cache fabric when the corresponding memory line is in the modified state in the L2 cache as shown in column 47, the invalid state in the other L1 caches as shown in column 49, and the shared state in the issuing L1 cache as shown in column 51. The number of SSV caches may be one as shown in column 53, in the illustrated example. Additionally, after the snoop invalidation operation, the memory line will be in the invalid state in the L2 cache as shown in column 55, the invalid state in the other L1 caches as shown in column 57, and the invalid state (due to a state change) in the issuing L1 cache as shown in column 59, wherein the number of SSV caches will change to zero in column 61, in the illustrated example. The valid bit may be cleared in the issuing L1 cache as shown in column 63, and a snoop invalidation operation may be conducted as shown in column 65. Similar transitions and/or rules may be implemented for snoop invalidation operation scenarios in which the corresponding memory line is in the exclusive, shared and/or invalid state in the L2 cache, as demonstrated in the remainder of table 50.

FIG. 3E shows a coherency protocol table 52 for snoop data operations originating from a host processor such as, for example, a cache coupled to a host processor 14 (FIG. 1A), already discussed. In the illustrated example, the tenth row 68 of the table 52 demonstrates that a snoop data operation may be directed to the graphics cache fabric when the corresponding memory line is in the exclusive state in the L2 cache as shown in column 47, the shared state in the other L1 caches as shown in column 49, and the invalid state in the issuing L1 cache as shown in column 51. The number of SSV caches may be one as shown in column 53, in the illustrated example. Additionally, after the snoop data operation, the memory line will be in the shared state (due to a state change) in the L2 cache as shown in column 55, the invalid state in the other L1 caches as shown in column 57, and the invalid state in the issuing L1 cache as shown in column 59, wherein the number of SSV caches will remain at one as shown in column 61, in the illustrated example. Moreover, no actions may need to be taken with regard to the valid bit as shown in column 63 or with regard to cross snoop operations as shown in column 65. Similar transitions and/or rules may be implemented for snoop data operation scenarios in which the corresponding memory line is in the modified, shared and/or invalid state in the L2 cache, as demonstrated in the remainder of table 52.

Figure 4:
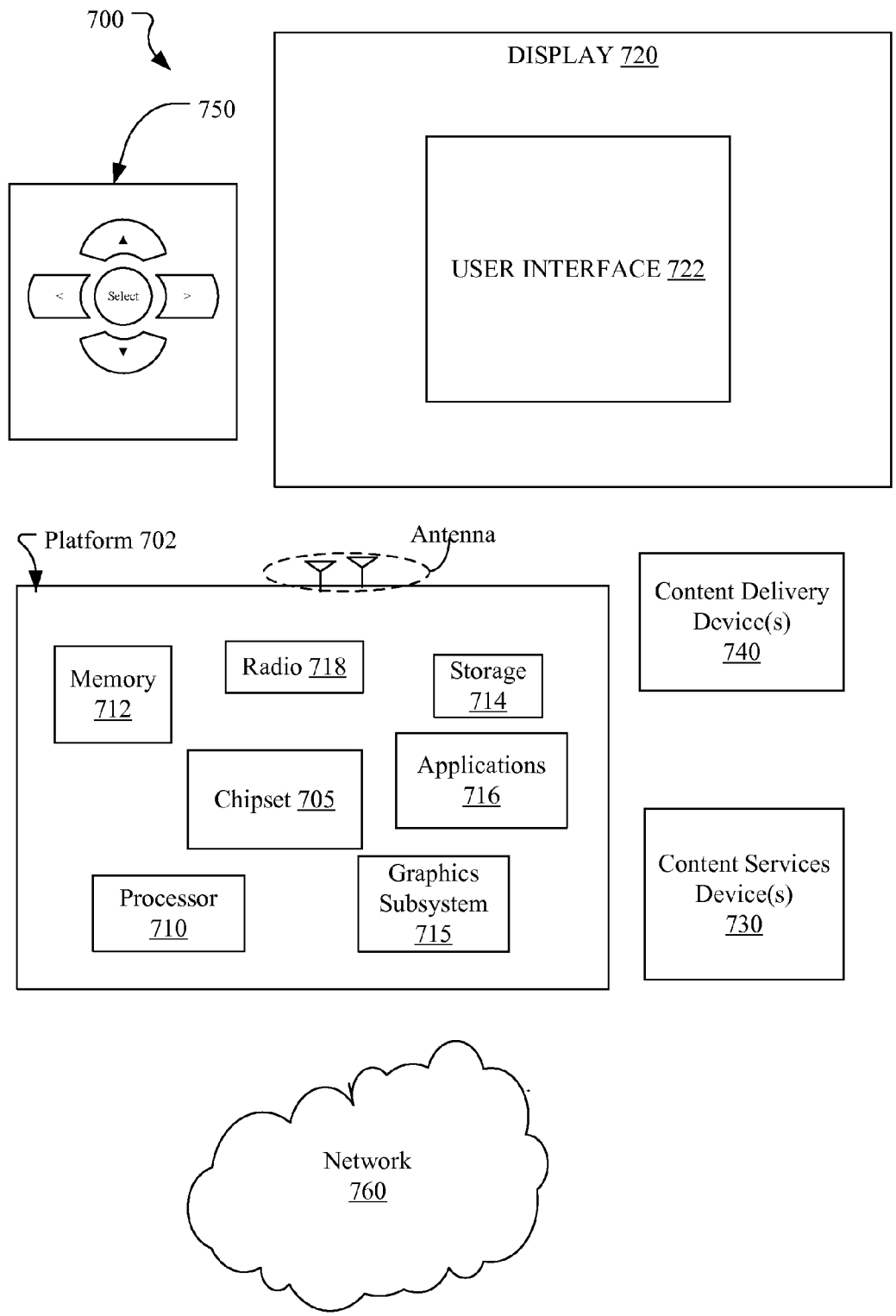
FIG. 4 is a block diagram of an example of a system having a navigation controller according to an embodiment.

FIG. 4 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth. Thus, the system 700 may be used to maintain cache coherency for video bitstreams as described herein.

In embodiments, the system 700 comprises a platform 702 coupled to a display 720 that presents visual content. Platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. The graphics subsystem 715 may therefore include the graphics processor 20 (FIG. 1A), already discussed. In addition, the processor 710 may be configured to operate as one or more of the host processors 14 (FIG. 1A), already discussed, via instructions obtained from the memory 712, the storage 714 or other suitable source. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

Figure 5:
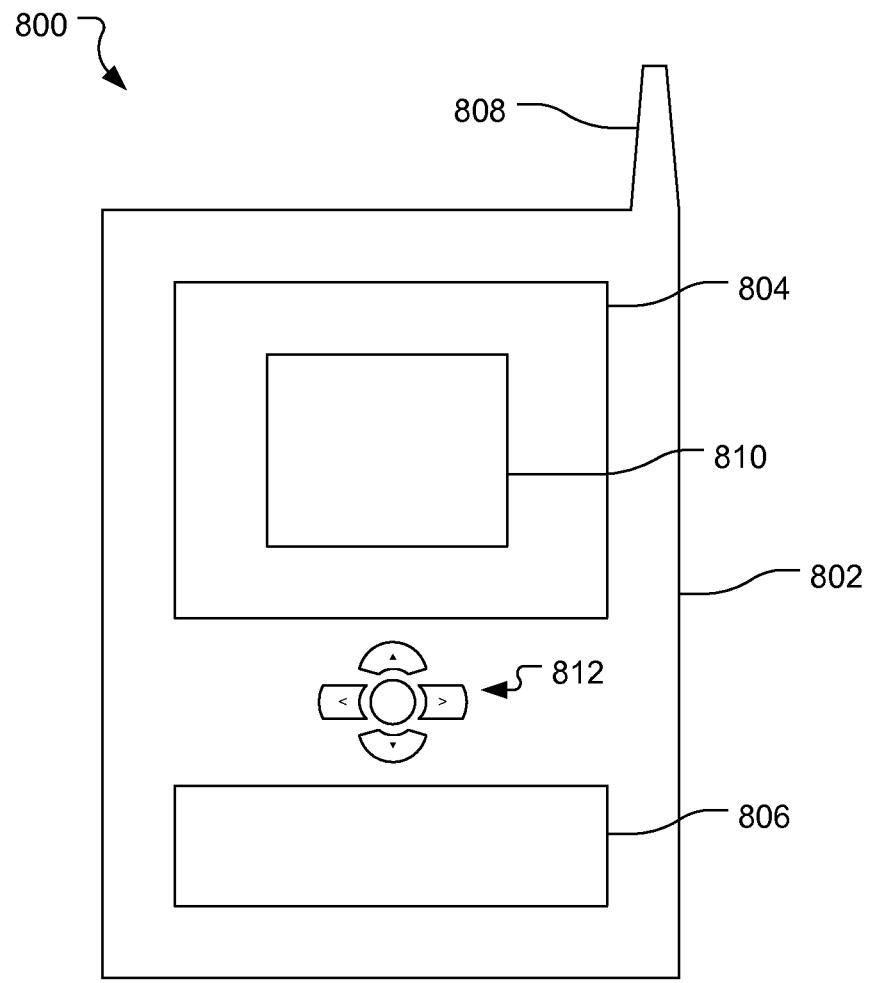
FIG. 5 is a block diagram of an example of a system having a small form factor according to an embodiment.

As described above, system 700 may be embodied in varying physical styles or form factors. FIG. 5 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 5, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Additional Notes and Examples

Example 1 may include a system to implement a graphics cache hierarchy, comprising a display to present visual content, a system cache coupled to one or more host processors and a system memory, a graphics interface coupled to the system cache, and a graphics processor coupled to the graphics interface. The graphics processor may include a physically distributed set of compute slices to execute a plurality of work items associated with the visual content, and a cache fabric to maintain a coherency of one or more memory lines associated with the plurality of work items across the graphics processor, the system memory and the one or more host processors. The cache fabric may include a plurality of level one (L1) caches, each L1 cache being dedicated to an execution block of a compute slice, a physically distributed shared cache structure, wherein the coherency of the one or more memory lines is to be maintained across the plurality of L1 caches and the shared cache structure, and a plurality of crossbar nodes to track the one or more memory lines, each crossbar node being dedicated to a compute slice. The plurality of crossbar nodes may further distribute one or more snoop requests originating from the one or more host processors to the shared cache structure and the plurality of L1 caches via the graphics interface, collect one or more snoop results from the shared cache structure and the plurality of L1 caches, and communicate the one or more snoop results to the system cache.

Example 2 may include the system of Example 1, wherein the shared cache structure includes a plurality of independent level two (L2) caches, each L2 cache being dedicated to a compute slice.

Example 3 may include the system of Example 1, wherein the shared cache structure includes a level two (L2) cache having a plurality of banks, and wherein the shared cache structure is to hash at least one of the one or more memory lines across the plurality of banks.

Example 4 may include the system of any one of Examples 1 to 3, wherein the cache fabric is to use a modified, exclusive, shared, invalid (MESI) protocol to maintain the coherency of the one or more memory lines.

Example 5 may include a graphics processor comprising a physically distributed set of compute slices to execute a plurality of work items and a cache fabric to maintain a coherency of one or more memory lines associated with the plurality of work items across the graphics processor, a system memory and one or more host processors.

Example 6 may include the graphics processor of Example 5, wherein the cache fabric includes a plurality of level one (L1) caches, each L1 cache being dedicated to an execution block of a compute slice, a physically distributed shared cache structure, wherein the coherency of the one or more memory lines is to be maintained across the plurality of L1 caches and the shared cache structure, and a plurality of crossbar nodes to track the one or more memory lines, each crossbar node being dedicated to a compute slice.

Example 7 may include the graphics processor of Example 6, wherein the shared cache structure includes a plurality of independent level two (L2) caches, each L2 cache being dedicated to a compute slice.

Example 8 may include the graphics processor of Example 6, wherein the shared cache structure includes a level two (L2) cache having a plurality of banks, and wherein the shared cache structure is to hash at least one of the one or more memory lines across the plurality of banks.

Example 9 may include the graphics processor of Example 6, wherein the plurality of crossbar nodes are to distribute one or more snoop requests originating from a system cache coupled to the one or more host processors to the shared cache structure and the plurality of L1 caches.

Example 10 may include the graphics processor of Example 9, wherein the plurality of crossbar nodes are to collect one or more snoop results from the shared cache structure and the plurality of L1 caches, and communicate the one or more snoop results to a system cache coupled to the one or more host processors.

Example 11 may include the graphics processor of any one of Examples 5 to 10, wherein the cache fabric is to use a modified, exclusive, shared, invalid (MESI) protocol to maintain the coherency of the one or more memory lines.

Example 12 may include a system to implement a graphics cache hierarchy, comprising a display to present visual content and a graphics processor including a physically distributed set of compute slices to execute a plurality of work items associated with the visual content, and a cache fabric to maintain a coherency of one or more memory lines associated with the plurality of work items across the graphics processor, a system memory and one or more host processors.

Example 13 may include the system of Example 12, wherein the cache fabric includes a plurality of level one (L1) caches, each L1 cache being dedicated to an execution block of a compute slice, a physically distributed shared cache structure, wherein the coherency of the one or more memory lines is to be maintained across the plurality of L1 caches and the shared cache structure, and a plurality of crossbar nodes to track the one or more memory lines, each crossbar node being dedicated to a compute slice.

Example 14 may include the system of Example 13, wherein the shared cache structure includes a plurality of independent level two (L2) caches, each L2 cache being dedicated to a compute slice.

Example 15 may include the system of Example 13, wherein the shared cache structure includes a level two (L2) cache having a plurality of banks, and wherein the shared cache structure is to hash at least one of the one or more memory lines across the plurality of banks.

Example 16 may include the system of Example 13, wherein the plurality of crossbar nodes are to distribute one or more snoop requests originating from a system cache coupled to the one or more host processors to the shared cache structure and the plurality of L1 caches.

Example 17 may include the system of Example 16, further including a system cache coupled to the one or more host processors and the system memory, and a graphics interface coupled to the system cache, wherein the plurality of crossbar nodes are to collect one or more snoop results from the shared cache structure and the plurality of L1 caches, and communicate the one or more snoop results to the system cache via the graphics interface.

Example 18 may include the system of any one of Examples 12 to 17, wherein the cache fabric is to use a modified, exclusive, shared, invalid (MESI) protocol to maintain the coherency of the one or more memory lines.

Example 19 may include a method of operating a graphics processor, comprising executing, by a physically distributed set of compute slices, a plurality of work items, and maintaining, by a cache fabric, a coherency of one or more memory lines associated with the plurality of work items across the graphics processor, a system memory and one or more host processors.

Example 20 may include the method of Example 19, further including tracking, by a plurality of crossbar nodes, the one or more memory lines, wherein the coherency of the one or more memory lines is maintained across a plurality of level one (L1) caches and a physically distributed cache structure, each L1 cache being dedicated to an execution block of a compute slice and each crossbar node being dedicated to a compute slice.

Example 21 may include the method of Example 20, wherein the shared cache structure uses a plurality of independent level two (L2) caches to track the one or more memory lines, each L2 cache being dedicated to a compute slice.

Example 22 may include the method of Example 20, further including hashing at least one of the one or more memory lines across a plurality of banks of a level two (L2) cache.

Example 23 may include the method of Example 20, further including distributing, by the plurality of crossbar nodes, one or more snoop requests originating from a system cache coupled to the one or more host processors to the shared cache structure and the plurality of L1 caches.

Example 24 may include the method of Example 23, further including collecting, by the plurality of crossbar nodes, one or more snoop results from the shared cache structure and the plurality of L1 caches, and communicating, by the plurality of crossbar nodes, the one or more snoop results to a system cache coupled to the one or more host processors.

Example 25 may include the method of any one of Examples 19 to 24, further including using, by the cache fabric, a modified, exclusive, shared, invalid (MESI) protocol to maintain the coherency of the one or more memory lines.

Example 26 may include a system to implement a graphics cache hierarchy, comprising means for executing, by a physically distributed set of compute slices, a plurality of work items, and means for maintaining, by a cache fabric, a coherency of one or more memory lines associated with the plurality of work items across the graphics processor, a system memory and one or more host processors.

Example 27 may include the system of Example 26, further including means for tracking, by a plurality of crossbar nodes, the one or more memory lines, wherein the coherency of the one or more memory lines is to be maintained across a plurality of level one (L1) caches and a physically distributed cache structure, each L1 cache being dedicated to an execution block of a compute slice and each crossbar node being dedicated to a compute slice.

Example 28 may include the system of Example 27, wherein the shared cache structure is to use a plurality of independent level two (L2) caches to track the one or more memory lines, each L2 cache being dedicated to a compute slice.

Example 29 may include the system of Example 27, further including means for hashing at least one of the one or more memory lines across a plurality of banks of a level two (L2) cache.

Example 30 may include the system of Example 27, further including means for distributing, by the plurality of crossbar nodes, one or more snoop requests originating from a system cache coupled to the one or more host processors to the shared cache structure and the plurality of L1 caches.

Example 31 may include the system of Example 30, further including means for collecting, by the plurality of crossbar nodes, one or more snoop results from the shared cache structure and the plurality of L1 caches, and means for communicating, by the plurality of crossbar nodes, the one or more snoop results to a system cache coupled to the one or more host processors.

Example 32 may include the system of any one of Examples 26 to 31, further including means for using, by the cache fabric, a modified, exclusive, shared, invalid (MESI) protocol to maintain the coherency of the one or more memory lines.

Techniques may therefore achieve a coherent memory fabric between different system components in both integrated and attached GPUs, wherein the internal caches of host processors and graphics processors are visible to one another. The fabric may provide an interlocked hardware solution that maintains sequential consistency between work items and work groups on the GPU, without reliance on coarse grained solutions such as barriers, memory fences and unordered atomics. Moreover, the fabric may ensure memory consistency without incurring the negative performance impact of hardware flushes and software stack calls. Eliminating the reliance on specialized software stack programming may also make the system a viable alternative for a wider range of platforms and usage scenarios.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments of this have been described in connection with particular examples thereof, the true scope of the embodiments should not be so limited since other modifications will become apparent to the skilled practitioner upon a study of the drawings, specification, and following claims.

We claim:

1. A system comprising:
   a display to present visual content;
   a system cache coupled to one or more host processors and a system memory;
   a graphics interface coupled to the system cache; and
   a graphics processor coupled to the graphics interface, the graphics processor including:
   a physically distributed set of compute slices to execute a plurality of work items associated with the visual content, wherein each compute slice includes a plurality of execution blocks each having a plurality of execution units, and
   a cache fabric to maintain a coherency of one or more memory lines associated with the plurality of work items across the graphics processor, the system memory and the one or more host processors, wherein the cache fabric includes,
  a plurality of level one (L1) caches, each L1 cache being dedicated to an execution block of a compute slice,
  a physically distributed shared cache structure, wherein the coherency of the one or more memory lines is to be maintained across the plurality of L1 caches and the shared cache structure across the physically distributed set of compute slices, wherein the shared cache structure includes a level two (L2) cache having a plurality of banks, and wherein the shared cache structure is to hash at least one of the one or more memory lines across the plurality of banks, and
  a plurality of crossbar nodes to track the one or more memory lines, each crossbar node being dedicated to a compute slice and each crossbar node of the plurality of crossbar nodes being connected to the L1 cache of each of the plurality of execution blocks of the compute slice to which the crossbar node is dedicated, the plurality of crossbar nodes further to distribute one or more snoop requests originating from the system cache to the shared cache structure and the plurality of L1 caches via the graphics interface, collect one or more snoop results from the shared cache structure and the plurality of L1 caches, and communicate the one or more snoop results to the system cache.

2. The system of claim 1, wherein the shared cache structure includes a plurality of independent level two (L2) caches, each L2 cache being dedicated to a compute slice.

3. The system of claim 1, wherein the cache fabric is to use a modified, exclusive, shared, invalid (MESI) protocol to maintain the coherency of the one or more memory lines.

4. A graphics processor comprising:
  a physically distributed set of compute slices to execute a plurality of work items, wherein each compute slice includes a plurality of execution blocks each having a plurality of execution units; and
  a cache fabric to maintain a coherency of one or more memory lines associated with the plurality of work items across the graphics processor, a system memory and one or more host processors, wherein the cache fabric includes:
    a plurality of level one (L1) caches, each L1 cache being dedicated to an execution block of a compute slice, wherein each compute slice has a plurality of execution blocks;
    a physically distributed shared cache structure, wherein the coherency of the one or more memory lines is to be maintained across the plurality of L1 caches and the shared cache structure across the physically distributed set of compute slices, wherein the shared cache structure includes a level two (L2) cache having a plurality of banks, and wherein the shared cache structure is to hash at least one of the one or more memory lines across the plurality of banks; and
    a plurality of crossbar nodes to track the one or more memory lines, each crossbar node being dedicated to a compute slice and each crossbar node of the plurality of crossbar nodes being connected to the L1 cache of each of the plurality of execution blocks of the compute slice to which the crossbar node is dedicated.

5. The graphics processor of claim 4, wherein the shared cache structure includes a plurality of independent level two (L2) caches, each L2 cache being dedicated to a compute slice.

6. The graphics processor of claim 4, wherein the plurality of crossbar nodes are to distribute one or more snoop requests originating from a system cache coupled to the one or more host processors to the shared cache structure and the plurality of L1 caches.

7. The graphics processor of claim 6, wherein the plurality of crossbar nodes are to collect one or more snoop results from the shared cache structure and the plurality of L1 caches, and communicate the one or more snoop results to a system cache coupled to the one or more host processors.

8. The graphics processor of claim 4, wherein the cache fabric is to use a modified, exclusive, shared, invalid (MESI) protocol to maintain the coherency of the one or more memory lines.

9. A system comprising:
  a display to present visual content; and
  a graphics processor including:
    a physically distributed set of compute slices to execute a plurality of work items associated with the visual content, wherein each compute slice includes a plurality of execution blocks each having a plurality of execution units, and
    a cache fabric to maintain a coherency of one or more memory lines associated with the plurality of work items across the graphics processor, a system memory and one or more host processors, wherein the cache fabric includes:
      a plurality of level one (L1) caches, each L1 cache being dedicated to an execution block of a compute slice, wherein each compute slice has a plurality of execution blocks;
      a physically distributed shared cache structure, wherein the coherency of the one or more memory lines is to be maintained across the plurality of L1 caches and the shared cache structure across the physically distributed set of compute slices, wherein the shared cache structure includes a level two (L2) cache having a plurality of banks, and wherein the shared cache structure is to hash at least one of the one or more memory lines across the plurality of banks; and
      a plurality of crossbar nodes to track the one or more memory lines, each crossbar node being dedicated to a compute slice and each crossbar node of the plurality of crossbar nodes being connected to the L1 cache of each of the plurality of execution blocks of the compute slice to which the crossbar node is dedicated.

10. The system of claim 9, wherein the shared cache structure includes a plurality of independent level two (L2) caches, each L2 cache being dedicated to a compute slice.

11. The system of claim 9, wherein the plurality of crossbar nodes are to distribute one or more snoop requests originating from a system cache coupled to the one or more host processors to the shared cache structure and the plurality of L1 caches.

12. The system of claim 11, further including a system cache coupled to the one or more host processors and the system memory, and a graphics interface coupled to the system cache, wherein the plurality of crossbar nodes are to collect one or more snoop results from the shared cache structure and the plurality of L1 caches, and communicate the one or more snoop results to the system cache via the graphics interface.

13. The system of claim 9, wherein the cache fabric is to use a modified, exclusive, shared, invalid (MESI) protocol to maintain the coherency of the one or more memory lines.

14. A method of operating a graphics processor, comprising:
   executing, by a physically distributed set of compute slices, a plurality of work items, wherein each compute slice includes a plurality of execution blocks each having a plurality of execution units;
   maintaining, by a cache fabric, a coherency of one or more memory lines associated with the plurality of work items across the graphics processor, a system memory and one or more host processors;
   hashing at least one of the one or more memory lines across a plurality of banks of a level two (L2) cache; and
   tracking, by a plurality of crossbar nodes, the one or more memory lines, wherein the coherency of the one or more memory lines is maintained across a plurality of level one (L1) caches and a physically distributed cache structure across the physically distributed set of compute slices, each L1 cache being dedicated to an execution block of a compute slice and each crossbar node being dedicated to a compute slice having a plurality of execution blocks and being connected to the L1 cache of each of the plurality of execution blocks.

15. The method of claim 14, wherein the shared cache structure uses a plurality of independent level two (L2) caches to track the one or more memory lines, each L2 cache being dedicated to a compute slice.

16. The method of claim 14, further including distributing, by the plurality of crossbar nodes, one or more snoop requests originating from a system cache coupled to the one or more host processors to the shared cache structure and the plurality of L1 caches.

17. The method of claim 16, further including:
   collecting, by the plurality of crossbar nodes, one or more snoop results from the shared cache structure and the plurality of L1 caches; and
   communicating, by the plurality of crossbar nodes, the one or more snoop results to a system cache coupled to the one or more host processors.

18. The method of claim 14, further including using, by the cache fabric, a modified, exclusive, shared, invalid (MESI) protocol to maintain the coherency of the one or more memory lines.

* * * * *